US012812253B2

(12) United States Patent
Ho

(10) Patent No.: US 12,812,253 B2
(45) Date of Patent: Nov. 24, 2026

(54) SELF-CONTAINED, SOLAR-POWERED, AND PORTABLE CONNECTED CAMERA STATION

(71) Applicant: T-Mobile USA, Inc., Bellevue, WA (US)

(72) Inventor: Long Ching Macor Ho, Lynnwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 31 days.

(21) Appl. No.: 18/786,244

(22) Filed: Jul. 26, 2024

(65) Prior Publication Data

US 2026/0032345 A1 Jan. 29, 2026

(51) Int. Cl.

| | |
|---|---|
| ***H04N 23/695*** | (2023.01) |
| ***B62B 3/10*** | (2006.01) |
| ***B62B 5/04*** | (2006.01) |
| ***H02S 10/20*** | (2014.01) |
| ***H02S 10/40*** | (2014.01) |

(Continued)

(52) U.S. Cl.

CPC ............. *H04N 23/695* (2023.01); *B62B 3/10* (2013.01); *B62B 5/04* (2013.01); *H02S 10/20* (2014.12); *H02S 10/40* (2014.12); *H02S 20/32* (2014.12); *H04N 23/13* (2023.01)

(58) Field of Classification Search

CPC ...... H04N 23/695; H04N 23/13; H02S 10/20; H02S 10/40; H02S 20/32; B62B 3/10; B62B 5/04

USPC .......................................................... 348/376

See application file for complete search history.

(56) References Cited

U.S. PATENT DOCUMENTS

| | | | |
|---|---|---|---|
| 2003/0093805 | A1 | 5/2003 | Gin |
| 2006/0070110 | A1 | 3/2006 | Mercer |
| 2009/0099761 | A1 | 4/2009 | Davis et al. |

(Continued)

FOREIGN PATENT DOCUMENTS

| | | | |
|---|---|---|---|
| CN | 1648029 | A | 8/2005 |
| CN | 102999036 | B | 7/2015 |

(Continued)

OTHER PUBLICATIONS

Solarshoptv, Solar Mobile Surveillance Trailer with IP Cameras, 2018, https://www.youtube.com/watch?v=ZilnBPHL1a8.*

*Primary Examiner* — Joel W Fosselman

(74) *Attorney, Agent, or Firm* — Ashurst Perkins Coie US LLP

(57) ABSTRACT

A self-contained, portable connected camera apparatus is disclosed. The apparatus comprises a maneuverable cart that includes at least one storage compartment, a reorientable solar panel mechanically coupled to the cart, a rechargeable battery electrically coupled to a solar panel and configured to be recharged by the solar panel, an adjustable camera module configured to capture a still image or a live video, and a communication module configured to receive the still image or the live video from the adjustable camera module. The adjustable camera module is disposed on a mount coupled to the maneuverable cart. The adjustable camera module is adjustable with at least one degree of freedom of movement. The communication module is further configured to communicate the still image or the live video received from the adjustable camera module to a remote server.

18 Claims, 5 Drawing Sheets

(51) Int. Cl.
*H02S 20/32* (2014.01)
*H04N 23/13* (2023.01)

(56) References Cited

U.S. PATENT DOCUMENTS

| | | | | |
|---|---|---|---|---|
| 2013/0242137 | A1* | 9/2013 | Kirkland .................. | G01C 3/12 348/371 |
| 2014/0292527 | A1 | 10/2014 | Sisneros | |
| 2016/0026192 | A1* | 1/2016 | Phillips .................... | H04N 7/20 348/143 |
| 2017/0300051 | A1 | 10/2017 | Zhou et al. | |
| 2024/0214518 | A1 | 6/2024 | Montez | |

FOREIGN PATENT DOCUMENTS

| | | | |
|---|---|---|---|
| CN | 204721504 | U | 10/2015 |
| CN | 105163061 | A | 12/2015 |
| CN | 205408233 | U | 7/2016 |
| CN | 106060488 | A | 10/2016 |
| CN | 205901953 | U | 1/2017 |
| CN | 106888346 | A | 6/2017 |
| CN | 206553979 | U | 10/2017 |
| CN | 107896305 | A | 4/2018 |
| CN | 207514784 | U | 6/2018 |
| CN | 208046781 | U | 11/2018 |
| CN | 109189101 | A | 1/2019 |
| CN | 208581314 | U | 3/2019 |
| CN | 110168428 | A | 8/2019 |
| CN | 107168383 | B | 10/2019 |
| CN | 210578872 | U | 5/2020 |
| CN | 210822297 | U | 6/2020 |
| CN | 110289804 | B | 2/2021 |
| CN | 112422843 | A | 2/2021 |
| CN | 112468083 | A | 3/2021 |
| CN | 113056775 | A | 6/2021 |
| CN | 213637648 | U | 7/2021 |
| CN | 110520792 | B | 4/2022 |
| CN | 108737709 | B | 1/2024 |
| KR | 102189539 | B1 | 12/2020 |
| WO | 2009097280 | A1 | 8/2009 |
| WO | 2020078227 | A1 | 4/2020 |

* cited by examiner

SELF-CONTAINED, SOLAR-POWERED, AND PORTABLE CONNECTED CAMERA STATION

BACKGROUND

An internet protocol (IP) camera, also known as a network camera or a connected camera, is a type of digital video camera that receives control data and sends image data via an IP network. IP cameras are commonly used for surveillance, but unlike analog closed-circuit television (CCTV) cameras, they require no local recording device, only a local area network. Most IP cameras can be directly accessed over a network connection and can include an embedded video server having an IP address, capable of streaming the video (and sometimes, even audio).

BRIEF DESCRIPTION OF THE DRAWINGS

Detailed descriptions of implementations of the present invention will be described and explained through the use of the accompanying drawings.

Figure 1:
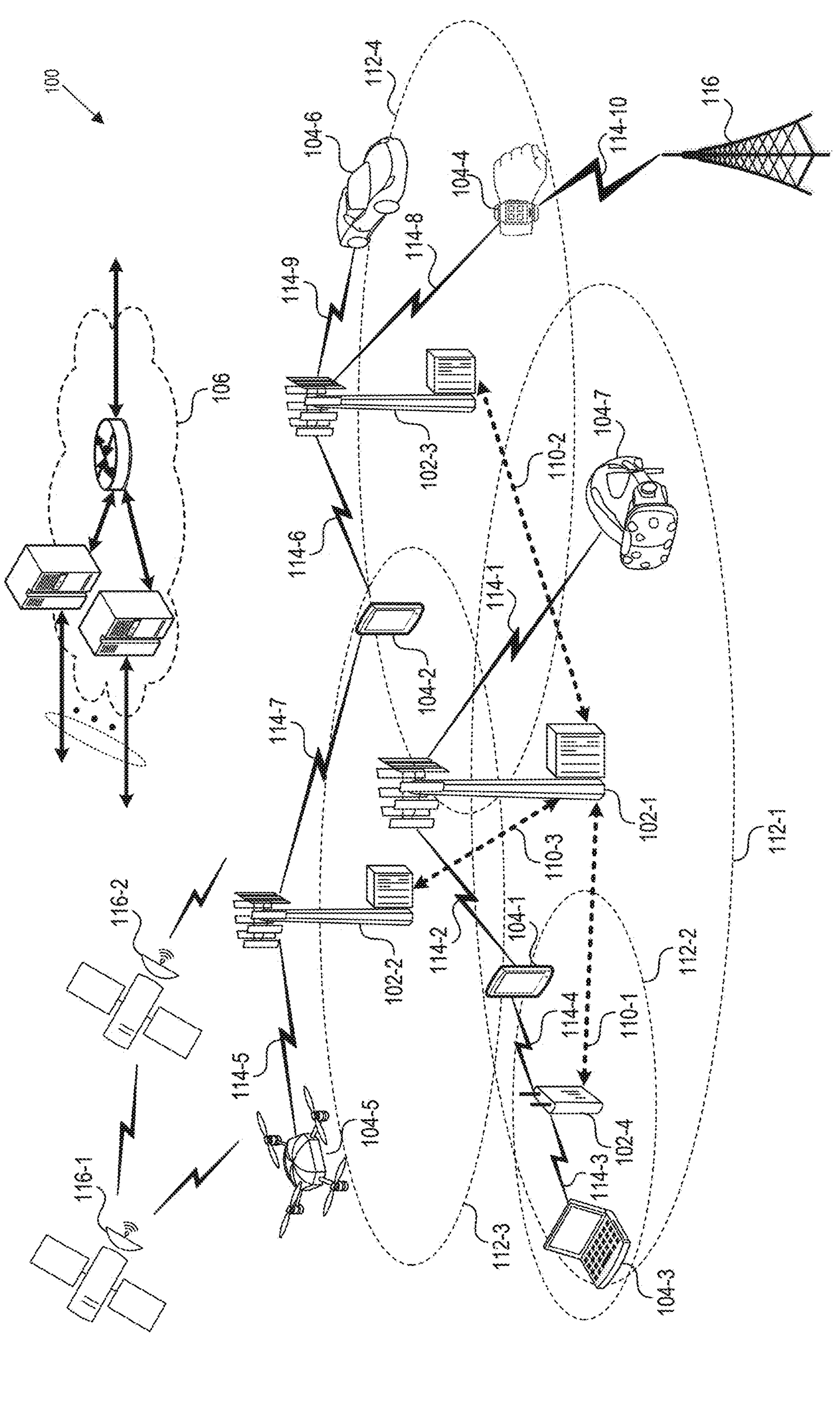
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a self-contained, portable, connected camera apparatus configured for remote deployment. In some embodiments, the apparatus comprises a portable and maneuverable cart. In some embodiments, the cart can include a plurality of wheels and a handle for maneuverability. In some embodiments, the cart can include a storage compartment. In some embodiments, the wheels can include a braking system to control a speed of travel of the cart. In some embodiments, the apparatus can include a camera module. In some embodiments, the camera module can be coupled with a communications module for uploading information captured by the camera to a remote server. In some embodiments, the communications module can include a network router, a network switch, or a modem supporting 4G, 5G, or other advanced communications technologies. In some embodiments, the camera can capture still images. In some embodiments, the camera can capture video or moving images. In some embodiments, the camera can include an infrared sensor configured to capture images or video in the infrared spectrum. In some embodiments, the camera can include a thermal sensor configured to capture a heat signature of objects in front of the camera. In some embodiments, the apparatus can include a solar panel configured to convert solar energy incident upon the solar panel into electrical energy. In some embodiments, the apparatus can include a mechanism for reorienting the solar panel towards the sun to maximize the capture of solar energy by the solar panel. In some embodiments, the solar energy captured by the solar panel can be stored in a battery disposed in the apparatus. In some embodiments, the apparatus can include a power inverter configured to convert direct current (DC) to an alternating current (AC). In some embodiments, the camera can be disposed on a mount configured to impart the camera at least one degree of freedom of movement. In some embodiments, the at least one degree of freedom of movement can include an ability to linearly reposition the camera along at least one perpendicular axis. In some embodiments, the at least one degree of freedom of movement can include an ability to rotationally reposition the camera about at least one perpendicular axis. In some embodiments, the apparatus can include a protective covering to protect the various aforementioned components of the apparatus.

The inventor has recognized a need for deploying cameras in remote areas or at construction sites for security surveillance and smart city applications for extended periods of time. These areas often lack power sources and internet connectivity. Further, these areas often lack paved roads, making them difficult to access and carry equipment to. Similar limitations exist in areas affected by wildfires, where first responders may need to set up camera equipment to monitor conditions. In an urban area affected by wildfire, the power infrastructure may be experiencing a temporary or localized outage. On the other hand, in an uninhabited area affected by wildfire, power infrastructure may be nonexistent. The technology disclosed herein comprises a self-contained cart equipped with a camera with 5G connectivity, coupled with a solar panel for charging a battery which, in turn, is connected to an uninterruptible power supply (UPS) and/or an inverter to supply continuous and uninterrupted power to the connected camera. In some embodiments, the cart can be equipped with ruggedized wheels to adapt it for use on difficult terrain. The cart can be transported to a remote location, the solar panel oriented to maximize the capture of solar energy, and the camera configured to record and upload still images or a live video feed to a remote server using the communications module. Further, the remote server can be configured to run computer vision algorithms and analytics engines to extract information from the images or video.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/ gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

Self-Contained, Solar-Powered, and Portable Connected Camera Station

Figure 2:
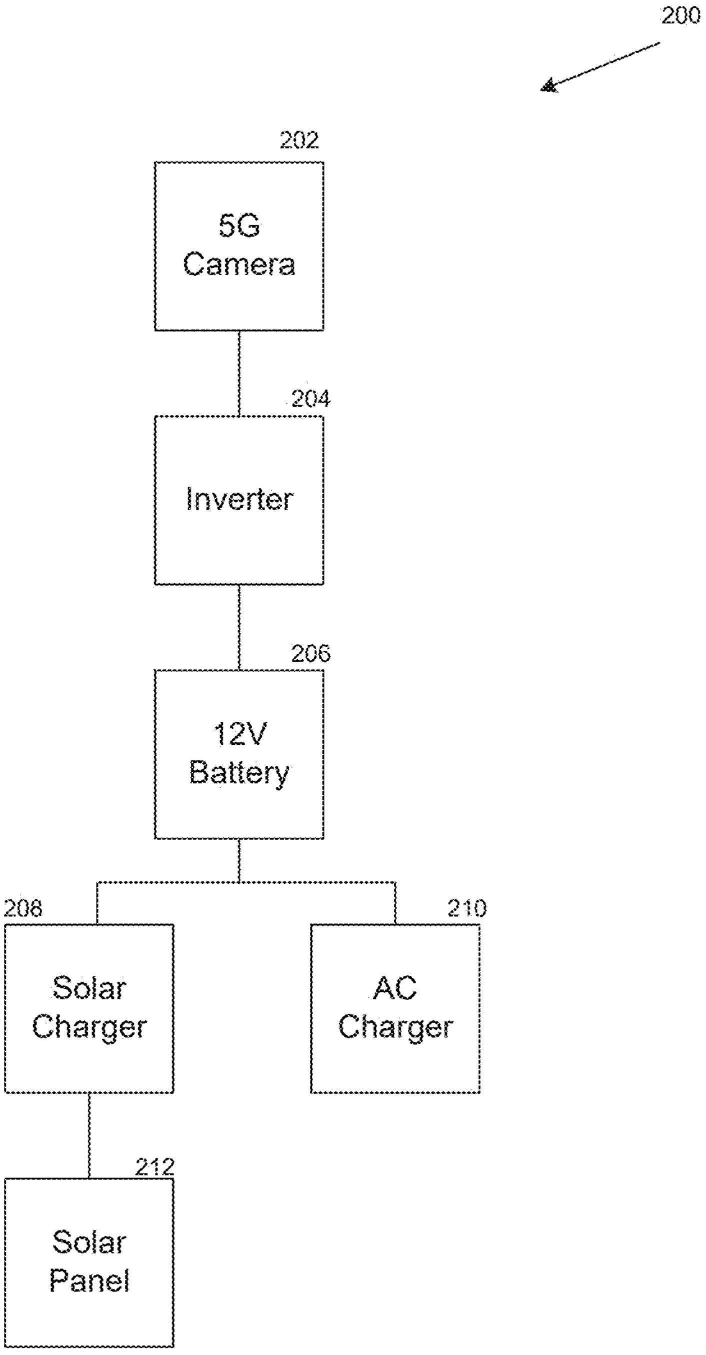
FIG. 2 is a block diagram of a system in which at least some aspects of the disclosed technology are implemented.

FIG. 2 is a block diagram of a system 200 in which at least some aspects of the disclosed technology are implemented. The system can include a camera 202. In some implementations, the camera 202 can be a connected camera that is coupled with a communications module. In some implementations, the communications module that the camera 202 is coupled to can be a 5G modem, and the camera 202 can be referred to as a 5G camera. In some implementations, the system can include a solar panel 212 that is electrically coupled to a solar charger 208. In some implementations, the solar panel 212 can be configured to convert solar energy incident upon the solar panel 212 into electrical energy. In some implementations, the solar charger 208 can be configured to store the electrical energy generated by the solar panel 212 into an energy storage device 206. In some implementations, the energy storage device 206 can be a battery. In some implementations, the energy storage device 206 can be a 12-Volt (12V) battery. In some implementations, the energy storage device 206 can be electrically coupled to an alternating current (AC) charger 210. The AC charger 210 can be configured to store electrical energy from an external electric source into the energy storage device 206. In some implementations, the energy storage device 206 can configured to be charged using electrical energy from the solar charger 208, the AC charger 210, or both, depending on which energy source is available at a location of the system. In some implementations, the energy storage device 206 can be coupled to an inverter 204 that is configured to convert a direct current (DC) generated by the energy storage device 206 into AC to power the camera 202.

Figure 3:
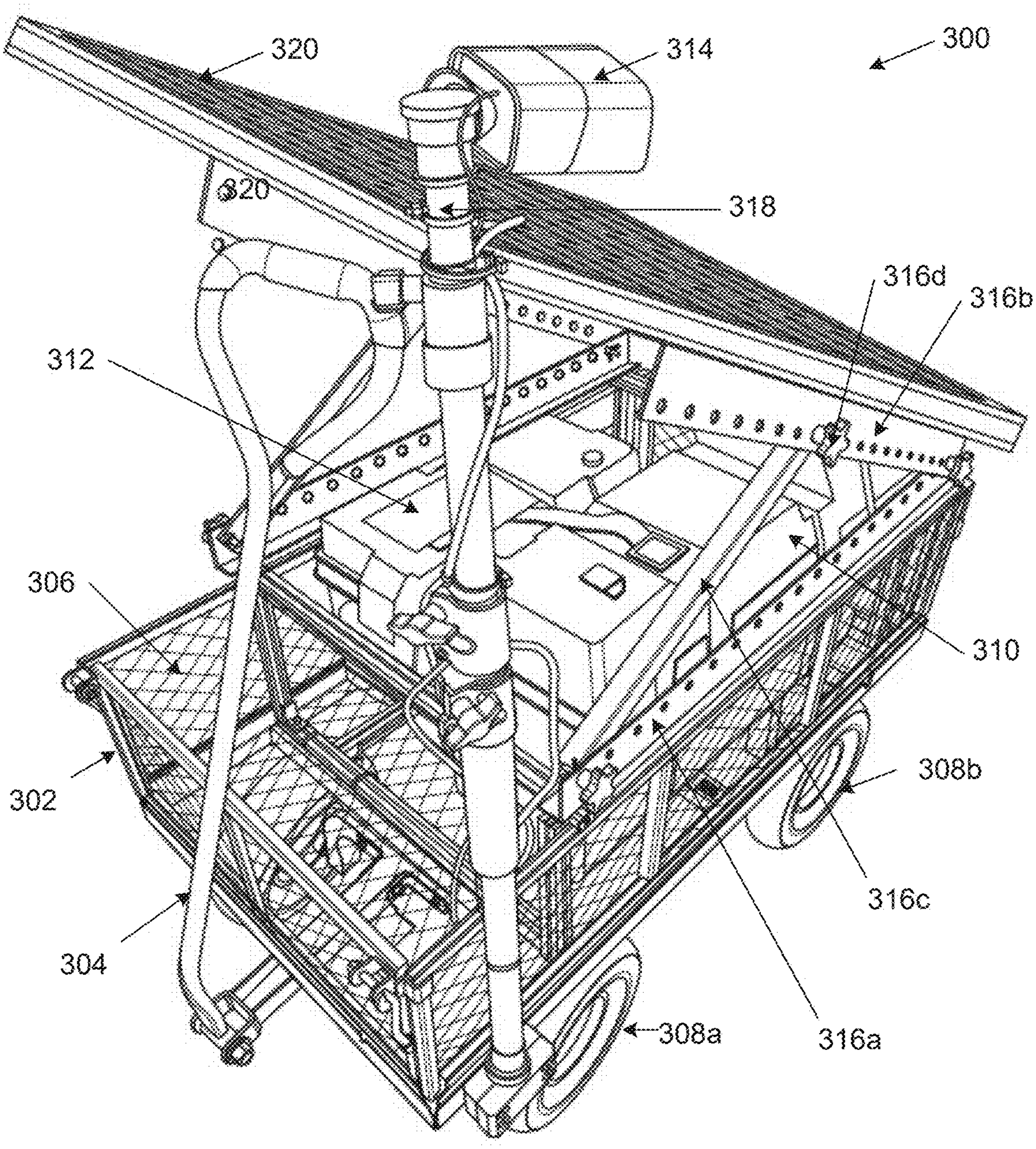
FIG. 3 is a diagram of an apparatus in which at least at least some aspects of the disclosed technology are implemented.

FIG. 3 is a diagram of an apparatus 300 in which at least some aspects of the disclosed technology are implemented. In some implementations, the apparatus can include a cart 302. In some implementations, an interior volume of the cart 302 can comprise at least one storage compartment 306. In some implementations, the cart 302 can include a plurality of wheels **308*a*, 308*b*, and so on. The plurality of wheels 308*a*, 308*b*, and so on can be collectively referred to as wheels 308 of the cart 302. In some embodiments, the cart 302 can be maneuvered using a handle 304 coupled to the cart 302. In some embodiments, a speed of travel of the cart can be controlled by operating a braking system coupled to the cart. In some embodiments, the braking system can be coupled to wheels 308 of the cart 302**.

In some embodiments, the apparatus can include a solar panel 320 configured to convert solar energy incident upon the solar panel 320 into electrical energy. The solar panel 320 can comprise a plurality of solar cells. In some embodiments, the solar panel 320 can be coupled to the cart 302 near a top plane of the storage compartment 306 of the cart 302. In some embodiments, the solar panel 320 can be reoriented to face the sun to maximize the capture of solar energy by the solar panel 320 at different times in a day as the sun traverses across the sky. In some embodiments, the solar panel 320 can be configured to be reorientable at an angle to a horizontal plane along at least one direction. In some embodiments, the solar panel 320 can be reoriented to face the sun using a mechanism comprising a first arm **316*a* coupled to the cart 302, a second arm 316*b* coupled to the solar panel 320, and a third connecting arm 316*c* coupled to the first two arms 316*a* and 316*b*. In some embodiments, at least one of arm 316*a*, 316*b*, and 316*c* can comprise a plurality of slots. In some embodiments, the first arm 316*a* can be coupled to the connecting arm 316*c* using a hinge mechanism. In other embodiments, the first arm 316*a* can be coupled to the connecting arm 316*c* using a knob coupled to a slot each in the first arm 316*a* and the connecting arm 316*c*. In some embodiments, the second arm 316*b* can be coupled to the connecting arm 316*c* using a hinge mechanism. In other embodiments, the second arm 316*b* can be coupled to the connecting arm 316*c* using a knob 316*d* coupled to a slot each in the second arm 316*b* and the connecting arm 316*c*. In some embodiments, the apparatus can include a plurality of sets of each of the first arm 316*a*, second arm 316***b*, connecting arm 316*c*, and knob 316*d*, each set coupled to an opposite side of the solar panel 320.

In some embodiments, the apparatus can include a camera 314 coupled to the cart 302. In some embodiments, the camera 314 can be configured to capture a still image. In some embodiments, the camera 314 can be configured to capture video. In some embodiments, the camera 314 can be configured to capture still images or video in the spectrum of light that is visible to the human eye. In some embodiments, the camera 314 can be configured to capture still images or video in the infrared spectrum of light. In some embodiments, the camera 314 can be configured to capture thermal still images or video. In some embodiments, the camera 314 can be a connected camera that is configured to upload a still image or a video to a remote server. In some embodiments, the apparatus can include a communications module configured to receive a still image or a video from the camera 314 and communicate the received still image or video to a remote server. In some embodiments, the communications module can include a network switch configured to share a network connection among a plurality of networking-capable devices connected to the network switch. In some embodiments, the communications module can include a Wi-Fi router configured to provide network connectivity to a networking-capable device connected to the Wi-Fi router. In some embodiments, the communications module or the connected camera can include a 4G or 5G modem. In some embodiments, the camera 314 and the communications module can be integrated into a single physical unit. In some embodiments, the camera 314 and the communications module can be separate devices disposed in the apparatus.

In some embodiments, the camera 314 can be disposed on a mount coupled to the cart 302. In some embodiments, the camera 314 can be adjustable with at least one degree of freedom of movement. In some embodiments, the at least one degree of freedom of movement of the camera 314 can include an ability to linearly reposition the camera 314 along at least one of three mutually perpendicular axes of the apparatus to reposition the camera 314 forward, backward, upward, downward, leftward, or rightward from a current position of the camera 314. In some embodiments, the at least one degree of freedom of movement of the camera 314 can include an ability to rotationally reposition the camera 314 about at least one of three mutually perpendicular axes of the apparatus to adjust a yaw, pitch, or roll of camera 314.

Figure 4:
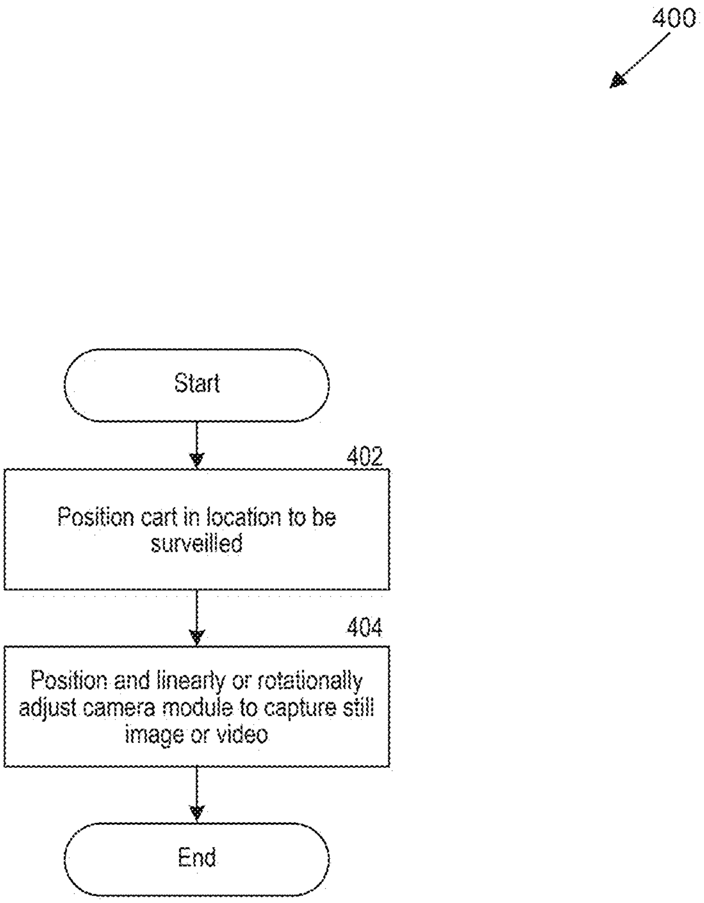
FIG. 4 is a flowchart of a method for using some aspects of the disclosed technology for a remote surveillance application.

FIG. 4 is a flowchart of a method 400 for using some aspects of the disclosed technology for a remote surveillance application. The method can be implemented using an apparatus that includes the disclosed technology. In some embodiments, the apparatus can include a self-contained, portable, connected camera apparatus comprising a maneuverable cart comprising a plurality of wheels, a handle, and a braking system. The handle can be configured to control a direction of travel of the cart. The braking system can be coupled to at least one wheel of the plurality of wheels. The braking system can be further configured to control a speed of travel of the maneuverable cart. In some embodiments, the maneuverable cart can include at least one storage compartment and a reorientable solar panel mechanically coupled to the cart. The reorientable solar panel can further comprise a plurality of solar cells configured to convert solar energy incident upon a top surface of the reorientable solar panel into electrical energy. The reorientable solar panel can be reorientable by adjusting an angle of inclination of the reorientable solar panel with a horizontal plane. In some embodiments, the maneuverable cart can include a rechargeable battery electrically coupled to at least one energy source that is configured to be recharged by the at least one energy source. In some embodiments, the at least one energy source can include an AC charger. In some embodiments, the at least one energy source can include the reorientable solar panel. In some embodiments, the apparatus can further include an adjustable camera module disposed on a mount coupled to the maneuverable cart. The adjustable camera module can be configured to capture a still image or a live video. In some embodiments, the adjustable camera module can be adjustable with at least one degree of freedom of movement. The at least one degree of freedom of movement of the adjustable camera module can include an ability to linearly reposition the adjustable camera module along at least one of three mutually perpendicular axes of the apparatus to reposition the camera forward, backward, upward, downward, leftward, or rightward from a current position of the adjustable camera module. In some embodiments, the at least one degree of freedom of movement of the adjustable camera module can include an ability to rotationally reposition the adjustable camera module about at least one of three mutually perpendicular axes of the apparatus to adjust a yaw, pitch, or roll of the adjustable camera module.

In some embodiments, the adjustable camera module can be configured to capture information in the visible electromagnetic spectrum. In some embodiments, the adjustable camera module is configured to capture information in the infrared electromagnetic spectrum. In some embodiments, the adjustable camera module can be configured to capture a thermal still image or video.

In some embodiments, the maneuverable cart can further include a communication module configured to receive the still image or the live video from the adjustable camera module. The communication module can be further configured to communicate the still image or the live video received from the adjustable camera module to a remote server. In some embodiments, the communication module can include a 5G modem. In some embodiments, the communication module can include a network switch. In some embodiments, the communication module can include a Wi-Fi router. In some embodiments, the adjustable camera module and the communication module can be disposed as a single device. In some embodiments, the adjustable camera module and the communication module can be disposed as separate devices.

At 402, the maneuverable cart can be positioned at a location that is to be remotely surveilled. At 404, the adjustable camera module can be positioned to enable the adjustable camera module to capture a still image or video of an area in front of the adjustable camera module by linearly moving the camera forward, backward, upward, downward, leftward, or rightward. In some embodiments, the adjustable camera module can be further positioned to capture a still image or video of an area in front of the adjustable camera module by rotationally adjusting a yaw, pitch, or roll of the adjustable camera module.

Computer System

Figure 5:
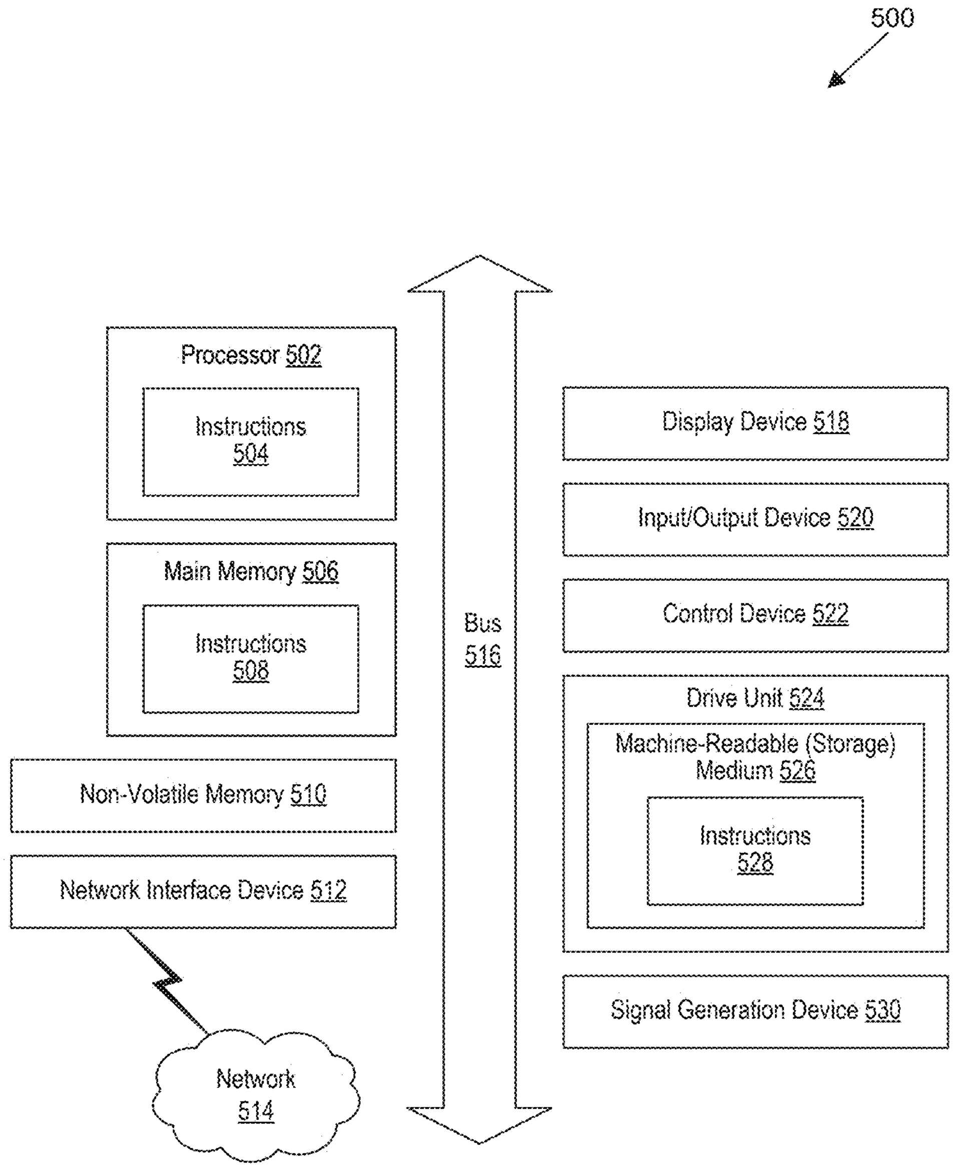
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, a video display device 518, an input/output device 520, a control device 522 (e.g., keyboard and pointing device), a drive unit 524 that includes a machine-readable (storage) medium 526, and a signal generation device 530 that are communicatively connected to a bus 516.

The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementations, the computer system 500 can be an embedded computer system, a system-on-chip (SOC), a single-board computer system (SBC), or a distributed system such as a mesh of computer systems, or it can include one or more cloud components in one or more networks. Where appropriate, one or more computer systems 500 can perform operations in real time, in near real time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. A self-contained, portable connected camera apparatus comprising:

a maneuverable cart comprising at least three wheels, a handle, and a braking system,
  wherein the handle is configured to control a direction of travel of the cart,
  wherein the braking system is coupled to at least one wheel of the at least three wheels,
  wherein the braking system is configured to control a speed of travel of the maneuverable cart, and
  wherein the maneuverable cart includes at least one storage compartment;

a reorientable solar panel mechanically coupled to the cart,
  wherein the reorientable solar panel further comprises a plurality of solar cells configured to convert solar energy incident upon a top surface of the reorientable solar panel into electrical energy, and
  wherein the reorientable solar panel is reorientable by adjusting an angle of inclination of the reorientable solar panel with a horizontal plane;

a rechargeable battery electrically coupled to at least one energy source,
  wherein the rechargeable battery is configured to be recharged by the at least one energy source, and
  wherein the at least one energy source includes the reorientable solar panel;

an adjustable camera module disposed on a mount coupled to the maneuverable cart,
  wherein the adjustable camera module is configured to capture a still image or a live video, and
  wherein the adjustable camera module is adjustable with at least four degrees of freedom of movement,
  wherein the at least four degrees of freedom of movement of the adjustable camera module include an ability to linearly reposition the adjustable camera module upward and downward,
  wherein the at least four degrees of freedom of movement of the adjustable camera module further include an ability to rotationally reposition the adjustable camera module to adjust a yaw, pitch, and roll of the adjustable camera module;

an uninterruptible power supply (UPS) and an inverter coupled to the rechargeable battery, wherein the UPS and the inverter are configured to supply uninterrupted power to the adjustable camera module; and a communication module configured to receive the still image or the live video from the adjustable camera module,
  wherein the communication module is further configured to communicate the still image or the live video received from the adjustable camera module to a remote server.

2. The apparatus of claim 1, wherein the at least four degrees of freedom of movement of the adjustable camera module further includes an ability to linearly reposition the adjustable camera module along at least one of two mutually perpendicular axes of the apparatus, and wherein linearly repositioning the adjustable camera module along at least one of two mutually perpendicular axes of the apparatus includes repositioning the camera forward, backward, leftward, or rightward from a current position of the adjustable camera module.

3. The apparatus of claim 1, wherein the at least one energy source includes an alternating current (AC) charger.

4. The apparatus of claim 1, wherein the communication module includes a 5G modem.

5. The apparatus of claim 1, wherein the communication module includes a network switch.

6. The apparatus of claim 1, wherein the communication module includes a Wi-Fi router.

7. The apparatus of claim 1, wherein the adjustable camera module is configured to capture information in a frequency range of an electromagnetic spectrum that is visible to a human eye.

8. The apparatus of claim 1, wherein the adjustable camera module is configured to capture information in an infrared range of frequencies of the electromagnetic spectrum.

9. The apparatus of claim 1, wherein the adjustable camera module is configured to capture a thermal still image or video.

10. The apparatus of claim 1, wherein the adjustable camera module and the communication module are disposed as a single device.

11. The apparatus of claim 1, wherein the adjustable camera module and the communication module are disposed as separate devices.

12. A self-contained, portable system for remote surveillance, the system comprising:

a maneuverable cart comprising at least three wheels, a handle, and a braking system, wherein the handle is configured to control a direction of travel of the cart, wherein the braking system is coupled to at least one wheel of the at least three wheels, wherein the braking system is configured to control a speed of travel of the maneuverable cart, and wherein the maneuverable cart includes at least one storage compartment;

a reorientable solar panel mechanically coupled to the cart, wherein the reorientable solar panel further comprises a plurality of solar cells configured to convert solar energy incident upon a top surface of the reorientable solar panel into electrical energy, and wherein the reorientable solar panel is reorientable by adjusting an angle of inclination of the reorientable solar panel with a horizontal plane;

a rechargeable battery electrically coupled to at least one energy source, wherein the rechargeable battery is configured to be recharged by the at least one energy source, and wherein the at least one energy source includes the reorientable solar panel;

an adjustable camera module disposed on a mount coupled to the maneuverable cart, wherein the adjustable camera module is configured to capture a still image or a live video, and wherein the adjustable camera module is adjustable with at least four degrees of freedom of movement, wherein the at least four degrees of freedom of movement of the adjustable camera module include an ability to linearly reposition the adjustable camera module upward and downward, wherein the at least four degrees of freedom of movement of the adjustable camera module further include an ability to rotationally reposition the adjustable camera module to adjust a yaw, pitch, and roll of the adjustable camera module;

an uninterruptible power supply (UPS) and an inverter coupled to the rechargeable battery, wherein the UPS and the inverter are configured to supply uninterrupted power to the adjustable camera module; and a communication module configured to receive the still image or the live video from the adjustable camera module, wherein the communication module is further configured to communicate the still image or the live video received from the adjustable camera module to a remote server.

13. The system of claim 12, wherein the at least four degrees of freedom of movement of the adjustable camera module further includes an ability to linearly reposition the adjustable camera module along at least one of two mutually perpendicular axes of the system, and wherein linearly repositioning the adjustable camera module along at least one of two mutually perpendicular axes of the system includes repositioning the camera forward, backward, leftward, or rightward from a current position of the adjustable camera module.

14. The system of claim 12, wherein the at least one energy source includes an alternating current (AC) charger.

15. The system of claim 12, wherein the communication module includes a 5G modem, a network switch, or a Wi-Fi router.

16. The system of claim 12, wherein the adjustable camera module is configured to capture information in a frequency range of an electromagnetic spectrum that is visible to a human eye.

17. The system of claim 12, wherein the adjustable camera module is configured to capture information in an infrared range of frequencies of the electromagnetic spectrum.

18. The system of claim 12, wherein the adjustable camera module is configured to capture a thermal still image or video.

* * * * *